Jan. 24, 1939.  W. D. GIBSON  2,144,720
PROCESS FOR PRODUCING PASTRIES AND THE LIKE
Filed June 1, 1936  6 Sheets-Sheet 2

Inventor
W. Douglas Gibson.
Attorney.

Jan. 24, 1939.  W. D. GIBSON  2,144,720
PROCESS FOR PRODUCING PASTRIES AND THE LIKE
Filed June 1, 1936  6 Sheets-Sheet 3

Jan. 24, 1939.  W. D. GIBSON  2,144,720
PROCESS FOR PRODUCING PASTRIES AND THE LIKE
Filed June 1, 1936  6 Sheets-Sheet 5

Inventor
W. Douglas Gibson.

Attorney.

Patented Jan. 24, 1939

2,144,720

UNITED STATES PATENT OFFICE 2,144,720

PROCESS FOR PRODUCING PASTRIES AND THE LIKE

William Douglas Gibson, Los Angeles, Calif., assignor to Gibson Made Products, Inc., Los Angeles, Calif.

Application June 1, 1936, Serial No. 82,908

7 Claims. (Cl. 107—54)

My invention relates to bakery goods, particularly pastries and the like, and is directed to an improved method of manufacturing such goods.

While my invention may be readily utilized in the production of a wide range of bakery goods, it is peculiarly applicable to the production of pastries or crackers, and, therefore, by way of illustrating the principles involved for the purpose of disclosure to those skilled in the art, I shall describe my invention as applied specifically to the production of crackers.

The general object of my invention is to produce a superior product economically.

In the prevailing practice, it is customary to form dough into baking units by stamping the dough with dies of the required configuration, the dies being provided with a plurality of pins known as dockers that perforate the dough, causing the two sides of the dough unit to stick together. Some means is necessary, also, to strip the dough units from the dies.

The individual dough units are usually baked in sheet metal pans and are later sprayed with an edible oil such as butter or the like, or immersed en masse in an oil bath and then drained.

In the regions of the docker marks, the finished cracker is relatively thin and the material relatively compact, and in the remaining areas of the cracker, puffs or convexities develop, caused by voids or gas pockets in the dough. The full potentialities for inflation in these latter areas are, however, seldom realized in practice, the puffs either failing to develop, or developing irregularly. As a result, the pattern of puff areas of a cracker, as heretofore manufactured, is irregular and the cracker as a whole is undesirably heavy and compact.

Oven heat warps and distorts the individual crackers from the original shape of the dough units and the edges of the crackers are often over-baked. Excessive browning of the cracker margins is caused, in part, by the fact that heat is delivered edgewise to the edge of the cracker as well as through both faces of the cracker, and, in part, by the further fact that the distortion caused by baking curls the edges of the cracker into greater exposure to the heat.

The superiority of my product is represented in several characteristics, two of the most important of which are the exceptional degree of puff or convexity of the cracker and the exceptionally large proportion of the surface of the cracker that is puffed. The superiority also is furthered by uniformity of the product. The crackers are uniformly baked, the puffed areas are disposed in a uniform pattern, and the cracker is uniform in contour and configuration.

The different aspects of superiority of my product are to be attributed to various novel steps and procedures in my process that avoid undesirable results inescapable in the other methods.

For example, the customary use of stamping dies, whereby the whole dough unit is formed simultaneously, has unfavorable effects. The shock of the die and the severity of the stripping action take some of the "life" out of the dough, lessening the sponginess of the dough and mitigating against the desired tendency of the dough, under the action of heat, to expand vertically into puff areas. Dough units so formed result in undesirable hardness of the finished cracker. Besides being subject to the shock of the stamp, the dough is unduly compressed by the stamping process, because the cutting edges of the die, entering the edges of the dough unit simultaneously, effectively trap air over the dough surface, and the impact of the stamp momentarily compresses this air. The result is that the dough unit is momentarily subject to a pressure that damages its texture and lowers the quality of the finished product.

I have discovered that the sponginess of the dough and the desired responsiveness to heat may be conserved if the dough is formed in smooth progression into dough units for baking. In my invention, the desirably smooth transition from the unformed to the formed state of the dough is achieved by progressively applying an arcuate forming member, such as a forming roll, the curved surface of the forming member having ridges to outline the dough units and having ample recesses between the ridges to receive the dough and into which the dough is caused to bulge for the formation of puff areas.

A desirable degree of bulge of the dough into the recesses of the forming member may be obtained by adjusting the thickness of the unformed dough, the dimensions of the ridges, and the spacing of the ridges, these being the three important factors. It will be found that the gauging of these factors for a desired result is neither difficult nor complicated, if the principle is grasped, but is simply a matter of adjustment well within the expected skill of those experienced in the baking art. The thicker the sheet of unformed dough and the wider the ridges of the forming member, the greater the displacement of dough by the ridges, the displaced dough bulging into the recesses, and for a given thickness of dough sheet and width of ridge, there is a range of spacing of the ridges within which the dough will round into the recesses with substantially continuous curvature of dough surface from one ridge to the other.

Satisfactory results in the employment of my process may be obtained if the dough is formed into a sheet by suitable plain rolls and then simply subjected to the action of a forming roll, but my disclosure teaches that a degree of puff or convexity hitherto unattained in the art may be had, if, before applying the forming roll, the plain sheet of dough is crowded in a direction parallel with its surface in a manner to increase its thickness, and preferably such crowding is included at least once in the process. This crowding increases the sponginess of the dough and vertically elongates the voids in the dough, thereby increasing the tendency of the dough to expand vertically under heat.

I have also discovered that the bulging of the dough into the recesses is facilitated and the configuration of the cracker is improved, if the dough is resiliently supported when acted upon by the forming roll.

Excessive baking of the cracker edges and distortion in the configuration of the cracker, both of which defects are characteristic of the prior art, are avoided in my process by baking the cracker in the form of a sheet of interconnected dough units, the baked sheet being subsequently broken into separate crackers. This novel procedure is facilitated by arranging the forming member to impress or score the dough sheet with a pattern of contiguous dough units. By baking the crackers in sheet form, I avoid excessive exposure of the cracker edges to the effects of heat and I cause the dough units to support each other against distortion. In effect, the internal stresses that tend to distort one cracker are balanced by similar internal stresses of adjacent crackers. Preferably, the ridges on the forming roll are notched to form small ribs in the webs interconnecting the dough units.

The ridges may be employed solely to define the dough unit, or there may be a combination of primary ridges to outline dough units and secondary ridges to serve the purpose of the dockers of the prior art and, in addition, to define clearly the puff areas of the individual crackers. The difference between the primary ridges and the secondary ridges may be in the greater protuberance of the primary ridges, or in the more extensive notching of the secondary ridges, or in both respects.

A feature of my invention also contributing to the superiority of the product is the baking of the cracker sheet on an open support that exposes the under as well as the upper side of the dough.

A further object of my invention bearing on the superiority of the cracker is to avoid excess oil treatment of the baked product, such excess oil often undesirably saturating the crackers in the prevailing practices. This object is attained by placing the baked sheet on an open support that permits ready drainage and then spraying the baked sheet while still hot from the oven. The heat of the baked sheet reduces the viscosity of the oil, causing it to flow readily, and the open support permits the oil to drain away freely. This procedure is in contrast with a common practice in which the oil drips from one cracker to another, and in which voids in a mass of crackers tend to retain the oil.

In devising the various steps of my process, I have had in mind economy of production, and to that end I have diligently sought procedures that readily lend themselves to mass production. As a result, I have developed a sequence of operations that falls naturally into a scheme for continuous machine production of crackers, this being one of the prime objects of my invention.

Thus, one or more sets of plain rolls may be arranged to convert a continually replenished supply of dough into a continuous dough sheet for processing. The dough sheet is continuously conveyed under a forming roll, the desirable crowding of the dough to increase its sponginess being achieved by simply retarding the dough at some point in its progress to the forming roll. From the forming roll the sheet of interconnected dough units passes through an oven on a traveling screen, permitting direct exposure of both sides of the cracker, the length of the oven and the rate of conveyance being such that the crackers leave the oven when baked to the proper point. Emerging from the oven, the traveling baked sheet is sprayed from both sides with oil and finally is broken into individual crackers.

The process of separating the baked sheet into individual crackers as will be described is, in itself, novel.

Other objects, features, and advantages of my invention will be apparent from the detailed description to follow, taken with the accompanying drawings, in which.

Figure 3:
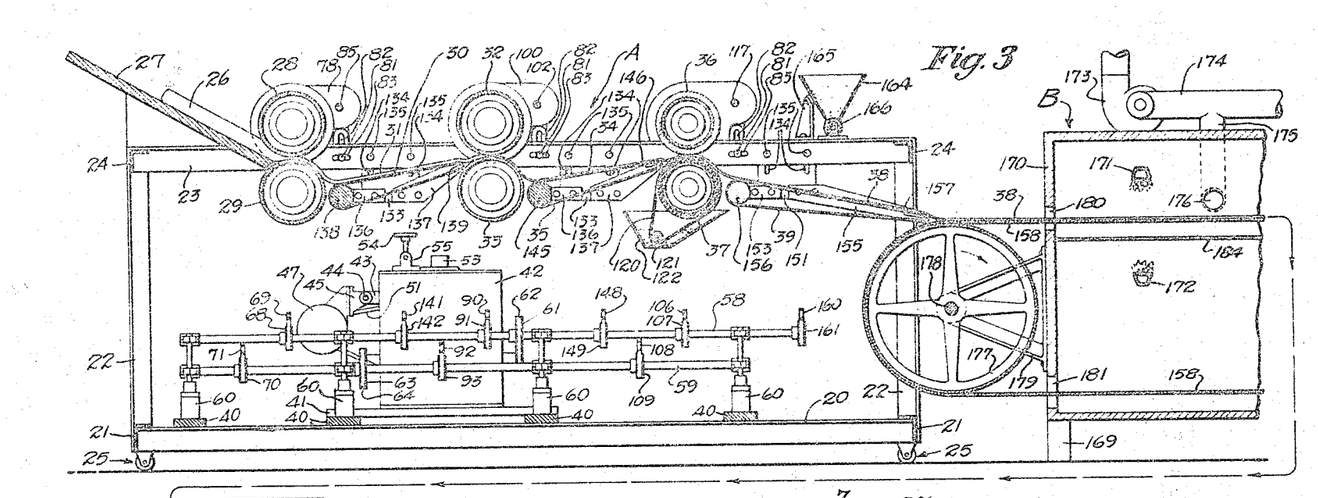
Fig. 3 is a vertical, longitudinal section, on a slightly reduced scale, taken on the line 3—3 of Fig. 2.
Figure 4:
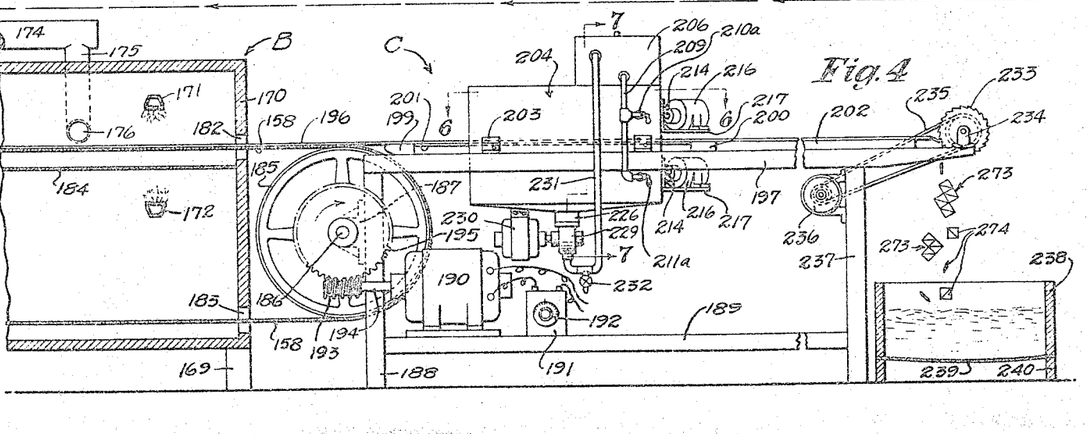
Fig. 4 is a continuation of Fig. 3, partly in side elevation and partly in longitudinal, vertical section, showing apparatus that may be employed to perform the later steps of my process.

As may be understood by reference to Figs. 3 and 4, the apparatus that may be used to carry out my process comprises three successive parts: a dough-treating mechanism generally designated by A; an oven designated B; and a finishing table designated C.

The dough-treating mechanism is mounted on a box-like, angle-iron frame having lower longitudinal members 20 (Fig. 3), lower end members 21, four upright members 22 at the corners, upper longitudinal members 23, and upper end members 24. Preferably, the frame is mounted on suitable casters 25 for mobility, whereby more than one dough-treating mechanism may be used interchangeably with the rest of the apparatus.

The general organization of the dough-treating mechanism may be understood by tracing the route of the dough to oven B. Beginning as an unformed slab 26 on feed board 27, the dough passes between a first pair of plain rolls 28 and 29, emerging on conveyor belt 30 as a plain sheet of dough 31. The dough then passes between a second pair of plain rolls 32 and 33, emerging as a sheet 34 of reduced thickness on a second conveyor belt 35. This latter belt feeds the dough through a pair of rolls comprising an upper forming roll 36 and a lower plain roll 37, from which the dough emerges as a formed sheet 38 of interconnected dough units. The formed sheet is carried by a suitable conveyor belt 39 to oven B.

It will be apparent that these various moving parts act at various related speeds. For instance, if the forming roll 36 is set to form the dough at a given rate, the speed of belt 35 and the rate at which the second pair of rolls 32 and 33 are revolved must be commensurate with the capacity of the forming roll; and in like manner the speed of belt 30 and of rolls 28 and 29 will be related to the capacity of rolls 32 and 33. It would be possible to arrange each of the conveyor belts to move at a rate having a fixed ratio to the rate of the three feeding pairs of rolls, but I find in practice that it is not desirable to have such fixed speed ratios, and I prefer, therefore, to arrange for individual speed adjustment, not only of each of the three pairs of rolls, but also of each of the three conveyor belts. An additional reason for introducing flexibility in speed ratios is that it may be desirable at various points to crowd the dough sheet longitudinally, as heretofore mentioned.

In addition to the individual speed controls for the separate moving parts, I contemplate incorporating in the dough-treating mechanism a master speed control for the mechanism as a whole. The drawings indicate one of the many possible arrangements that may be devised to provide the required adjustments.

Across lower longitudinal members 20 of the frame, are four spaced transverse sills 40, two of which support the ends of a pair of spaced, longitudinally disposed plates 41. These plates in turn support a master control housing 42.

A pair of brackets 43 extending from the sides of the housing hold a horizontal rod 44, on which rod is mounted a pair of hangers 45 carrying oppositely rotating motors 46 and 47. The two motors have drive pulleys 48 and 49 and drive belts 50 and 51, respectively, the pivotal mounting of the motors providing convenient means for tightening the belt.

In the particular type of speed control here shown, the two belts drive corresponding friction discs (not shown) within housing 42, and variation in speed is attained by axial movement of a friction gear (not shown) in driving contact with the two friction discs, said friction gear being slidingly splined to a vertical shaft 52 shown extending through a bearing 53 at the top of housing 42. The axial movement of the friction gear towards and away from the centers of the friction discs, and thereby the speed of rotation of the friction gear, is governed by a manually operable adjustment screw 54 mounted in a yoke 55 at the top of casing 42. The lower end of vertical shaft 52 acting through suitable beveled gears (not shown) drives in opposite directions pulleys 56 and 57 on opposite sides of housing 42.

Two counter shafts, an upper shaft 58 and a lower shaft 59, are journaled in suitable standards 60 mounted on sills 40. Keyed to upper shaft 58 is a suitable pulley 61 driven by pulley 57 of the master control through a belt 62; and likewise keyed to lower shaft 59 is a suitable pulley 63 driven by pulley 56 of the master control through a belt 64. It is apparent that these two counter shafts will move in opposite directions at equal speed.

Mounted on the lower level of the frame of the dough-treating mechanism, are three speed control boxes 65, 66, and 67 for adjusting the rate of speed, respectively, of the pair of rolls 28 and 29, the pair of rolls 32 and 33, and the pair of rolls 36 and 37.

A pulley 68 on upper shaft 58 drives a friction disc (not shown) in control box 65 through belt 69; and a similar pulley 70 on lower shaft 59 drives a second friction disc (not shown) through shaft 71. Between the two friction discs, and driven thereby, is a friction gear (not shown) slidingly keyed to a vertical shaft 72 that extends upward through a bearing 74 on the top of control box 65. The axial position of this friction gear is regulated by a suitable manually operable adjustment screw 75 that is mounted in a suitable yoke 76 on the top of the control box.

The first pair of rolls, 28 and 29, are mounted on one side of the machine in a gear-box 77 and on the other side of the machine are mounted in a suitable journal-box 78. Preferably, the two rolls rotate on stub shafts that are screw-threaded into journal-box 78, the exterior ends of the shaft having knurled flanges 78a to facilitate removal of the rolls for cleaning.

The drawings show that gear-box 77 is mounted to one of frame members 23 by means of suitable bolts 79 engaging corresponding slots 80 of the gear-box, the bolts also engaging longitudinal slots (not shown) in frame members 23. By virtue of this mode of attachment, the gear-box may be tilted to change the disposition of rolls 28 and 29 through a range of angles. In like manner, journal-box 78 on the opposite side of the machine is mounted by bolts 81 (Fig. 3) engaging slots 82 in the journal-box and slots 83 in a frame member 23 to permit the journal-box to be tilted with the gear-box.

Shaft 72 extending upward from control box 65 is connected through a suitable universal joint 84 with a vertical shaft (not shown) within gear-box 77, which shaft, through suitable worm gears, drives rolls 28 and 29.

Figure 1:
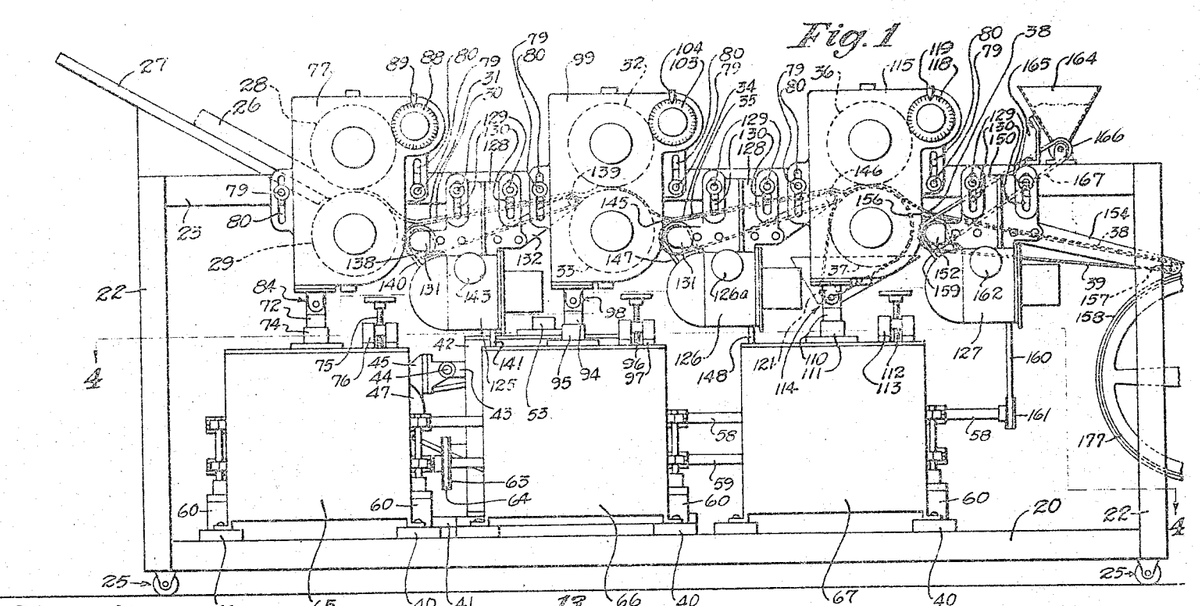
Fig. 1 is a side elevation of apparatus that may be used for performing the earlier steps of my process.
Figure 2:
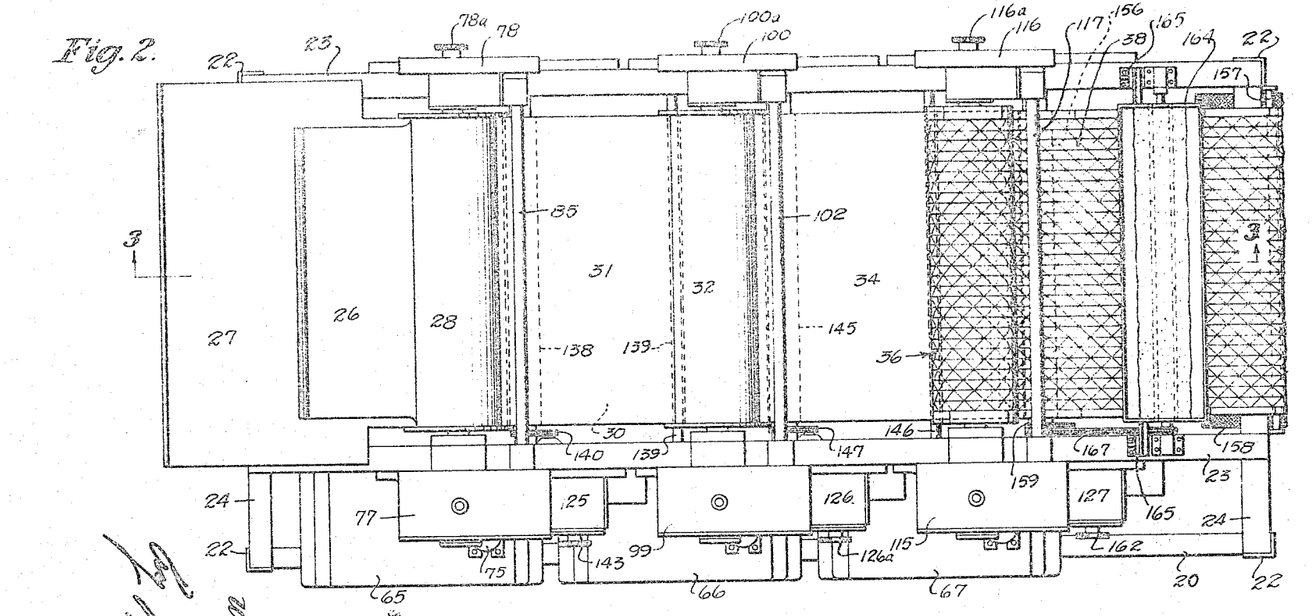
Fig. 2 is a plan view of the same.

Upper roll 28 is journaled in suitable eccentric members (not shown) in gear-box 77 and journal-box 78, by rotation of which eccentrics the spacing between rolls 28 and 29 may be readily varied. These eccentrics are synchronously interlocked through suitable gears (not shown) and a transverse shaft 85. The spacing of the two rolls is controlled by a manually operable dial 88 mounted on the outside of gear-box 77 and keyed to the end of shaft 86. Preferably, some means will be provided to show the relative position of the dial, such as an indicating finger 89 and index marks on the dial, as shown in Fig. 1.

It is apparent from the above description that the alignment of the two rolls may be changed by tilting gear-box 77 and journal-box 78, that the spacing of the two rolls may be controlled by adjustment through dial 88, and that the speed of rotation of the rolls may be regulated by manipulation of either adjustment screw 78 of control box 65, or adjustment screw 83 of the master control.

The mechanism (not shown) in control box 66 associated with rolls 32 and 33 is driven by a belt 90 from pulley 91 on upper shaft 58 and by a belt 92 from pulley 93 on lower shaft 59, the mechanism within control box 66 being similar to the mechanism in box 65. The rotation of the vertical shaft 94 extending upward through bearing 95 is controlled by manually operable adjustment screw 96 mounted in yoke 97 on the top of the box.

Through a suitable universal joint 98, shaft 94 is connected with the mechanism (not shown) in a gear-box 99 corresponding to gear-box 77, rolls 32 and 33 being mounted at one end in gear-box 99 and in the opposite end in a journal-box 100 corresponding to journal box 78.

Gear-box 99 and journal-box 100 are mounted by slot-engaging bolts in the same manner as gear-box 77 and journal-box 78, corresponding parts being given corresponding numbers.

In the same manner as before described, rolls 32 and 33 rotate on stub shafts threaded into journal-box 100, the shafts having knurled flanges 100a at their outer ends to facilitate removal of the rolls for cleaning.

The eccentrics for controlling the spacing of rolls 32 and 33 are synchronously interlocked by shaft 102, the shaft being controlled by an adjustment dial 103. The dial is provided as before with index marks to be read with reference to pointer 104.

The mechanism (not shown) in control box 67 associated with rolls 36 and 37 is driven by a belt 106 from a pulley 107 on upper shaft 58 and by a belt 108 from a pulley 109 keyed to lower shaft 59. This mechanism is similar to that in control boxes 65 and 66, the speed of rotation of the vertical shaft 110 extending upward through bearing 111 being controlled by a manually adjustable screw 112 that is carried by yoke 113 on the top of the control box.

Shaft 110, acting through a suitable universal joint 114, drives the concealed gears in a gear-box 115 that corresponds with gear-boxes 77 and 99, and the two rolls 36 and 37 are mounted at one end in gear-box 115 and in the opposite end in a journal-box 116 that corresponds to journal-boxes 78 and 100. The removal of these two rolls for cleaning or for changing rolls is facilitated as before described by the fact that the rolls at one end are carried by stub shafts having knurled flanges 116a.

Gear-box 115 and journal-box 116 are mounted to the frame of the dough-treating mechanism by the arrangement of bolts and slots heretofore described, corresponding parts being given corresponding numbers. The eccentrics controlling the spacing of the rolls are synchronously interlocked by a shaft 117 and controlled by an adjustment dial 118, there being a pointer 119 associated with the dial as heretofore described.

Figure 10:
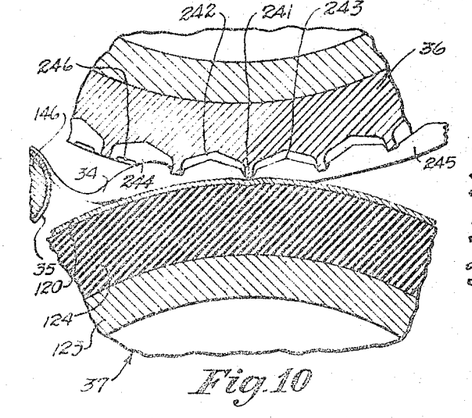
Fig. 10 is a fragmentary section, greatly enlarged, showing the action of dough passing through the forming roll of the aparatus.

Lower roll 37 that supports the dough in transit under forming roll 36 is covered by a suitable belt 120 of linen, or like material, the belt also passing around a lower roll 121 that is normally embedded in flour in a suitable flour pan 122. By virtue of this arrangement, the dough in being formed passes over a flour-covered surface that prevents its sticking to the surface of the belt. Preferably, lower roll 37 will have a steel shell 123 supporting a peripheral layer 124 of rubber, or like resilient material, as indicated in Fig. 10.

The speeds of belts 50, 55, and 60 are regulated by speed control boxes, the housings of which are shown, respectively, at 125, 126, and 127. Housing 125 is carried by a hanger 128, which in turn is adjustably mounted to the side of a frame member 23 by means of suitable bolts 129 that engage vertical slots 130 of the hanger.

Hanger 128 has a forwardly extending arm 131 and a rearwardly and upwardly extending arm 132; and on the opposite side of the machine, a hanger 133 (Fig. 5) having similar slots 134 engaged by bolts 135 has a corresponding forwardly extending arm 136 and a corresponding rearwardly and upwardly extending arm 137. Belt 138 is mounted on a lower driving roll 138 journaled in said two forward arms 131 and 136 and is also mounted on a smaller roll 139 journaled in the ends of said rearwardly and upwardly extending arms 132 and 137, this upper roll being in the proximity of the point where rolls 32 and 33 grip the dough sheet. Roll 138 is driven by a belt 140 from the mechanism (not shown) within control housing 125, and that mechanism is in turn driven by a belt 141 from a pulley 142 on upper shaft 58.

Several forms of speed control mechanism that would serve the purpose here are in common use. The type contemplated in this particular disclosure operates on the same principle as the speed control mechanism already described, including a friction disc and an axially movable friction gear, the axial movements of the friction gear being governed by a manual adjustment 143.

The arrangements for variably driving the second conveyer belt are the same as those just described. The hangers with their rearwardly and forwardly extending arms are identical to the hangers just described, corresponding numbers being used to designate corresponding parts. Belt 55 is mounted on a lower driven roll 145 and a second smaller roll 146, these rolls corresponding, respectively, to previously described rolls 138 and 139, and being similarly mounted. As the drawings indicate, the belt passing over roll 146 deposits dough sheet 34 on roll 37 under forming roll 36. Roll 145 is driven by a belt 147 from the variable speed mechanism (not shown) in housing 126, said mechanism being in turn driven by belt 148 from a pulley 149 on counter shaft 58. Speed changes are governed by an adjustment screw 126a, corresponding to adjustment 143 on housing 125.

The arrangement for driving with controlled variable speed the third conveyor belt 39 is similar to the arrangement described for belt 35, with some exceptions. The hanger 150 for speed control housing 127 is like the previously described hanger 128, and, on the opposite side of the machine, the complementary hanger 151 is like the previously described hanger 133, and both are mounted to the frame as previously described, corresponding parts being given corresponding numbers. The forwardly extending arm 152 of hanger 150 is similar to forward arm 131 of previously described hanger 128, and the complementary forwardly extending arm 153 of hanger 151 is similar to the corresponding arm 136 of previously described hanger 133. The rearward arm 154 attached to hanger 150 differs from corresponding arm 132 by being relatively long and inclined downward instead of upward, and the complementary rearwardly extending arm 155 of hanger 151 in the same manner differs from corresponding arm 137.

Belt 39 is carried by two rolls, a driven roll 156 mounted in the two forward arms 152 and 153 and a second roll 157 journaled in the ends of rearwardly extending arms 154 and 155, the latter roll being at the end of the frame of the dough-treating mechanism in a position to deposit the formed dough sheet 38 on conveyor belt 158 of oven B. Roll 156 is driven by a belt 159 from the mechanism (not shown) within housing 127, said mechanism being in turn driven by a belt 160 from a pulley 161 mounted on counter shaft 58. The rate at which belt 39 conveys dough is adjustable by the turning of a manual control 162.

Spanning transversely the frame of the dough-treating mechanism above belt 39, is a suitable salt hopper 164 supported by bracket 165. The bottom of the salt hopper is closed by a suitable transverse roll 166 with an intervening space just sufficient to pass grains of salt. Roll 166 is rotated by a belt 167 actuated by roll 156. I find that this arrangement may be adjusted to distribute evenly a small quantity of salt on the formed dough sheet 38 as it moves towards oven B.

The above described dough-treating mechanism, suggested as a means for carrying out my process, offers complete freedom in the matter of adjusting speed relationships. All of the moving parts may be simultaneously accelerated or retarded by manipulating the master adjustment screw 54. The rate of rotation of each of the moving parts may be separably controlled. Thus, the speed of rolls 28 and 29 is subject to manual control 75 and the spacing of the rolls may be varied by adjustment dial 86; the rate of rotation of rolls 32 and 33 is subject to manual adjustment 95 and the spacing of those rolls is controlled by adjustment dial 103; the speed of rotation of rolls 36 and 37 is subject to manual control 112 and the spacing of those rolls may be adjusted by manipulating dial 119. The rate at which dough is conveyed from the first pair of rolls to the second pair of rolls is controlled by adjustment 143; the rate of progress of the dough from the second pair of rolls to the third pair is controlled by manual adjustment 126a; and, finally, the rate at which the dough is conveyed from the forming roll to the oven is controlled by manual adjustment 162.

Between the time the dough is fed into the first pair of rolls and the time the dough is deposited on conveyor belt 39, five times the dough is delivered by one conveying means having an individual speed control to a second conveying means having an individual speed control. As a result, there are five opportunities at various points in the progress of the dough to produce a crowding effect by retarding the dough at a point of transmission.

Oven B mounted on suitable legs 169 has an elongated baking compartment 170, in which are suitably distributed an upper series of downwardly directed burners 171 and a similar lower series of upwardly directed burners 172. The products of combustion, as well as vapor released by baking, are drawn off by a blower 173, the blower being incorporated in a main duct 174 having branches 175 extending to corresponding ports 176 in the sides of the oven.

The oven conveyor belt 158 passes around a drum or large pulley 177 mounted on a shaft 178 journaled in a pair of standards 179 on the end of the oven. At the front end of the oven, the belt passes through an upper opening 180 and a lower opening 181; and at the rear end of the oven, the conveyor belt passes through similar openings, upper opening 182 and lower opening 183.

Preferably, a horizontal, heat-conducting partition 184 extends the length of the oven below openings 180 and 182 and above the series of lower burners 172, the purpose of this partition being to deflect any unduly extensive flame from the lower burners.

At the rear end of the oven, the oven conveyor belt passes over a second drum or wide pulley 185 mounted on a shaft 186 journaled in bearings 187 carried by the forward legs 188 of finishing table C. Mounted on lower longitudinal member 189 of the finishing table is a suitable motor 190, the speed of which is subject to control by a suitable rheostat 191 having a manual speed control adjustment 192. A worm gear 193 on shaft 194 of the motor drives a gear 195 keyed to shaft 186. By this arrangement, the speed at which the dough sheet is conveyed into and through the oven may be controlled by simply manipulating adjustment 192.

Figure 11:
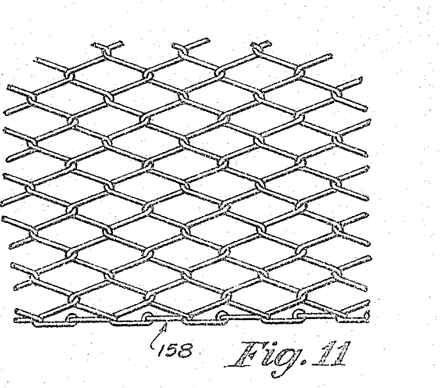
Fig. 11 is a fragmentary plan view of a portion of the conveyor belt used in the oven of my apparatus.

It will be understood that the length of the oven and the rate at which the oven belt 158 travels are such as to cause the dough sheet to emerge from the oven as a rigid cracker sheet 196, baked to the desired degree. Preferably, the oven conveyor belt 158 will be of open construction, to permit radiation of heat directly to the underside of the dough sheet. It is suggested that a wire screen, such as shown in Fig. 11, be employed for this purpose.

The frame at the top of the finishing table comprises two longitudinal members 197. These two longitudinal members are spanned by a pair of spaced transverse bars 199 and 200, the forward bar 199 being adjacent oven pulley 195 and on a level to receive the rigid baked cracker sheet as it is projected horizontally from the oven belt. The two transverse bars are interconnected by a plurality of taut wires 201. Propelled by the oven belt, the sheet moves along these wires and proceeds on to a table top 202.

Mounted on the finishing table frame by suitable brackets 203, is a spray chamber 204 surrounding wires 201, the spray chamber having suitable horizontal openings 205 to permit passage of the baked sheet through the chamber.

At the top of the spray chamber is an oil reservoir 206 to receive melted butter or other edible oil indicated at 207, the reservoir being accessible through an opening having a cover 208. From each side of the reservoir, down-flow pipes 209 terminate in an upper pair of nozzles 210 controlled by valves 210a and a lower pair of nozzles 211 controlled by valves 211a. These nozzles discharge jets of oil on corresponding upper spray discs 212 and lower spray discs 213.

Each disc is mounted on the end of a shaft 214 extending through a tubular bearing 215 mounted on the inner chamber wall, the shaft being driven by a suitable motor 216 carried by a bracket 217 on the outer wall of the chamber.

Figure 6:
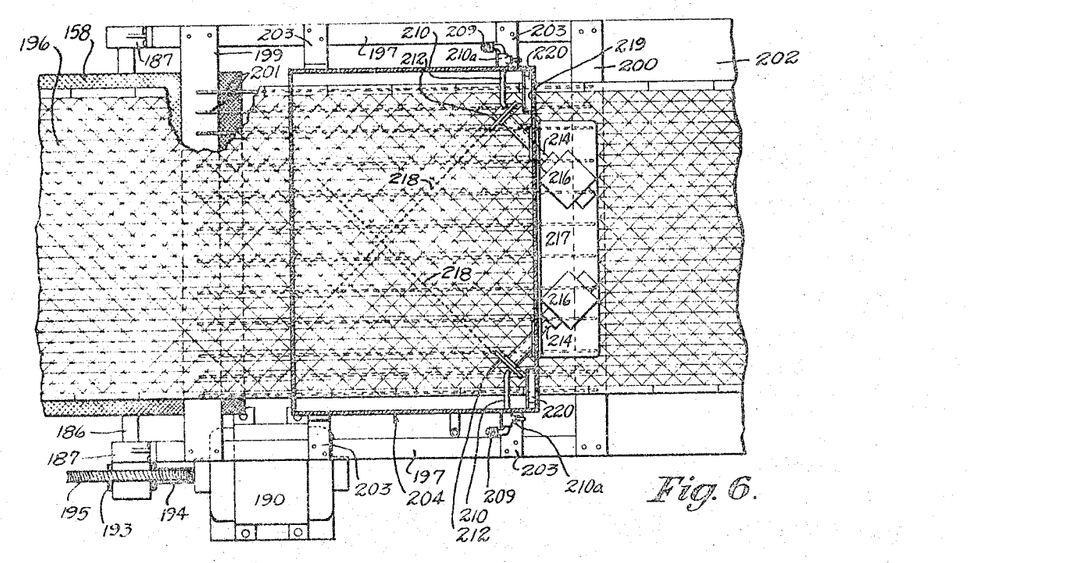
Fig. 6 is a plan view, slightly enlarged, of a portion of the mechanism shown in Fig. 4, part of the view being taken in horizontal section as indicated by the line 6—6 of Fig. 4.
Figure 7:
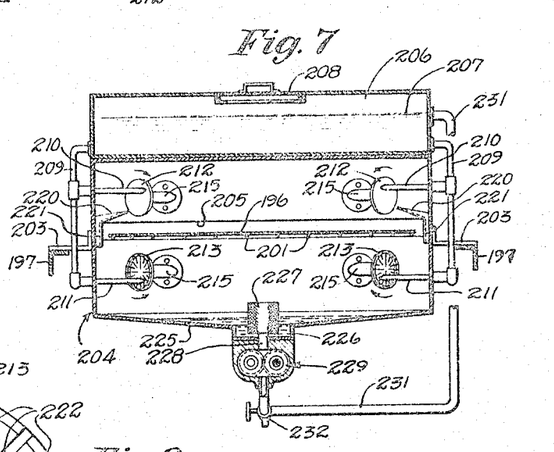
Fig. 7 is a vertical section of a portion of the mechanism, slightly enlarged, taken on the line 7—7 of Fig. 4.

The faces of the upper discs have plane surfaces and are disposed in diagonal planes. When these discs rotate at high speed in the direction indicated by the arrows, nozzles 210 delivering jets of oil against their faces as indicated by the drawings, each disc will produce by centrifugal action a downwardly disposed, fan-shaped spray, the two sprays intersecting each other as indicated by lines 218 in Fig. 6. Since spray delivered against the vertical wall 219 of the spray chamber streams downward towards the cracker sheet below (Fig. 6), suitable sheet metal traps 220 are provided to divert the oil, the traps having spouts 221 extending below the level of the cracker sheet.

Figure 8:
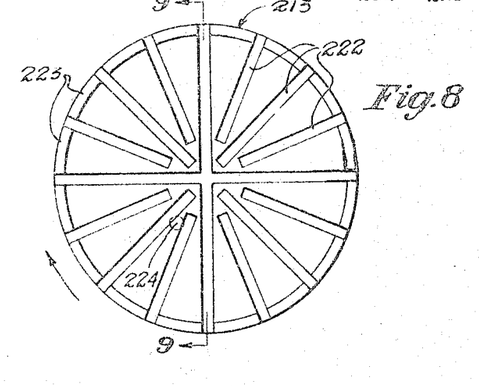
Fig. 8 is a view in elevation, greatly enlarged, of the face of one of the lower spray discs shown in Fig. 7.
Figure 9:
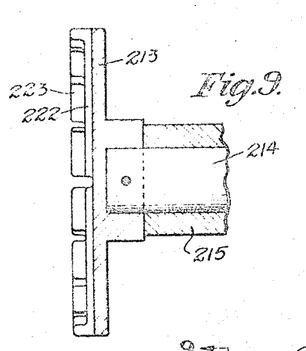
Fig. 9 is a section taken on the line 9—9 of Fig. 8.

Lower spray discs 213 below the level of wires 201 act similarly to upper discs 212, but are of slightly different construction, as may be understood by reference to Figs. 8 and 9. The difference is in the configuration of the faces of the discs, each disc being provided with a series of radial grooves 222 and a peripheral flange 223, the grooves extending through the flange. I have found that when such a disc is spun in the direction indicated by the arrow in Fig. 8 and a jet of oil is delivered against the disc at approximately the point 224, the result will be an upwardly directed, fan-shaped spray. The lower discs are also disposed in diagonal plane, intersecting in the same manner as the upper discs.

Oil draining from the walls of the spray chamber and dripping from the baked sheet 100 and wires 201 accumulates in the slightly conical bottom 225 of the chamber, a small cylindrical trap 226 being provided. The oil passes through a suitable screen 227 into a drainage pipe 228 leading to a suitable gear pump 229. Pump 229, driven by a suitable motor 230, returns the drained oil to reservoir 206 through a suitable return pipe 231, a suitable drain cock 232 being provided at the lower end of the pipe.

From the spray chamber, the baked sheet moves across table top 202 at the end of the finishing table and projects into space, where it encounters a suitable revolving roll 233 having a jagged or corrugated surface to catch the advancing edge of the cracker sheet. Roll 233 is mounted in a pair of brackets 234 on the ends of frame members 197 and is driven by a belt 235 from a motor 236 mounted on one of the rear legs 237 of the finishing table frame.

Fig. 4 shows, at the rear end of the finishing table under roll 233, a suitable tray 238 to catch the finished product. This tray has a bottom 239 of flexible material, preferably of wire screen. It will be noted that the tray rests on a complementary rectangle frame 260 which holds the tray spaced from the floor, thereby permitting bottom 239 to sag freely.

A study of the progress of material through this apparatus will teach a specific application of my process.

The slab of dough 26 on feed board 27 is replenished at intervals to provide a continuous sheet issuing from the first set of rolls 28 and 29. The dough, in progressing to the second set of rolls 32 and 33, may be crowded longitudinally either at its point of delivery to conveyor belt 30, or at its point of delivery onto lowermost roll 33. While a single set of rolls may be used to convert the slab of dough into a continuous sheet, preparatory to application of the forming roll, it has been found desirable to reduce the dough to such a sheet in at least two stages, not only because progressive reduction in thickness conserves the sponginess of the dough better than abrupt reduction in thickness, but also because the employment of two stages provides an opportunity to crowd the dough longitudinally as an intervening step.

The rolling of the dough into a sheet tends to elongate the voids of the dough horizontally, whereas vertical elongation of the dough is desirable to promote vertical inflation of the finished cracker in the puff areas. The crowding of the dough sheet longitudinally between the time it issues from the first pair of rolls and enters the second pair may offset the effect of the first rolls in horizontal elongation of the voids, or may go to the further extent of so elongating the voids vertically as to offset the effect of both the first pair of rolls and the second pair of rolls to follow.

The dough sheet 36 issuing from the second pair of rolls is delivered to belt 35 and thence is fed to rolls 36 and 37 for forming the dough. Here again the dough sheet may be crowded longitudinally either at the point of delivery to belt 35, or in the transmission to belt 130 that covers roll 37 under the forming roll.

It is to be understood that in my process choice is permitted in when and where the dough sheet is to be crowded and in the number of times it is to be crowded. For instance, I have found that in the production of a common cracker, a satisfactory vertical inflation of the finished product may be obtained if the dough is crowded but once, the crowding being done at the point of delivery to the forming rolls, as illustrated by Fig. 10.

It is obvious that if roll 37 moves faster than conveyor belt 35, the dough will be stretched out or elongated in the transmission from belt 35 to roll 37; whereas, if roll 37 travels slower than belt 35, a crowding of the dough sheet longitudinally may be provided.

In Fig. 10, the relative speed has been adjusted to provide transmission in almost a vertical plane. After the dough leaves belt 35, it is momentarily suspended, the dough being momentarily subject to tension by its own weight, so that there is a momentary tendency of the dough to elongate; but the elongation resulting from this momentary tension is more than compensated for by the crowding of the dough as it, in effect, piles up at the point of delivery to roll 37. It is apparent, then, that the crowding of the dough sheet longitudinally has a second purpose, i. e., it not only neutralizes the tendency of the various rolls to elongate the voids in the dough, as previously mentioned, but it also offsets the stretching of the dough that inescapably accompanies delivering the dough through space from a higher to a lower level. The drawings show that the dough sheet is subject to such tension at several points.

As the dough passes into contact with forming roll 36, ridges of the forming roll successively enter the dough sheet, displacing dough to each side of each advancing ridge into the adjacent recesses. Fig. 10 shows a transverse ridge 241 moved into dough sheet 36, displacing the dough forward into recess sheet 242 and rearward into recess sheet 243. The flow of the relatively viscous dough in the two directions from the ridge produces a bulge in the adjacent recesses, and this bulging of the dough is encouraged by the fact that, at the point of maximum pressure, ridge 241 compresses rubber layer 126 of the lower roll, causing the rubber layer also to bulge into the recesses at each side of the ridge. While such resiliency in the supporting surface that cooperates with the ridges of the forming roll is desirable, it is not essential, since a satisfactory bulging effect may be had by relying solely on the displacement of the dough by the ridges of the forming roll.

In Fig. 10, it will be noted that the bulge in the dough formed on the forward side of one ridge forms a substantially continuous curve with the bulge produced on the rearward side of the following transverse ridge of the forming roll, with the result that the profile of a puff area formed by two consecutive ridges is arcuate. This contour is of pleasing appearance, but other desirable configurations may be had by varying the spacing of the ridges, the width of the individual ridges, the thickness of the dough sheet, and perhaps the sponginess of the dough as affected by crowding the dough sheet longitudinally, the possible configurations ranging from extreme convexity to a relatively wide puff area that is substantially flat in the central portion and bulged only at the edges.

Fig. 10 shows other ridges 244 disposed longitudinally or obliquely of the dough sheet to complete the configuration of the various puff areas, the above remarks appertaining to the action of the transverse ridges being also applicable to these longitudinal or oblique ridges.

It will be noted that although the mass of dough directly under ridge 241 is expressed to either side of the ridge, a residual quantity of dough remains between the ridge and the supporting surface below, this residual quantity of dough constituting a web 245 interconnecting adjacent puff areas. It has been found desirable, although not essential, to provide notches in the ridges as indicated at 246, so that these relatively thick interconnected webs 245 will be reenforced with suitable ribs molded by the notches.

Where the ridges are employed solely to outline individual crackers, the ridges may be designed to make all of the connecting webs of equal strength; but if some of the ridges serve to outline crackers and other ridges serve merely to separate the individual crackers into puff areas, it is required that the ridges that outline the crackers weaken the dough sheet substantially more than the ridges which merely subdivide individual crackers. The required difference in the two types of scores on the dough sheet may be attained either by difference in the radial extent of the ridges, or by difference in the notching of the ridges. Preferably, both differences will be present, the ridges that outline the individual dough units being of greater radial protrusion by a few thousandths of an inch than the ridges that subdivide the crackers, and also having fewer or shallower or narrower notches to provide reenforcing ribs of less cross-sectional area.

An important feature of my invention is that the progressive molding of a dough unit avoids damaging pressure on the dough at the puff areas by the molding means. Air overlying the dough of a puff area cannot be trapped and then compressed to damage the dough as in the case where the puff area is formed along all edges simultaneously. It will be noted that since the transverse forming ridges are spaced apart peripherally on the surface of the roll, only one ridge at a time presses against the supporting surface of the lower roll to provide an air-tight seal, and even then the notches in the ridge discourage such a seal. As a result, air over a puff area at the molding stage is always free to escape as displaced by the bulging action of the dough.

The forming roll 36 may be designed to produce any desired pattern of interconnected dough units.

Figure 12:
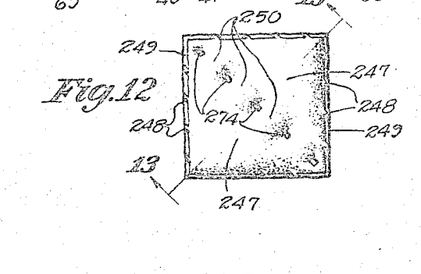
Fig. 12 is a plan view of a finished cracker that may be produced by my process.
Figure 13:
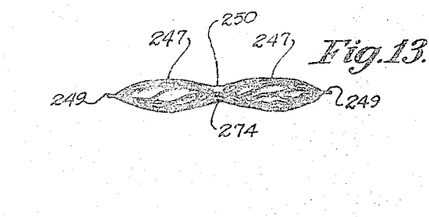
Fig. 13 is a section through the cracker taken on the diagonal 13—13 of Fig. 12.

For example, it may be desirable to produce a rectangular cracker such as shown in Figs. 12 and 13, the cracker being divided diagonally into two puff areas 247. It will be noted that the ribs 248 incorporated in the marginal web 249 are relatively narrow and of relatively slight vertical dimension; whereas the ribs 250 of the diagonal are of much greater width and height.

Figure 15:
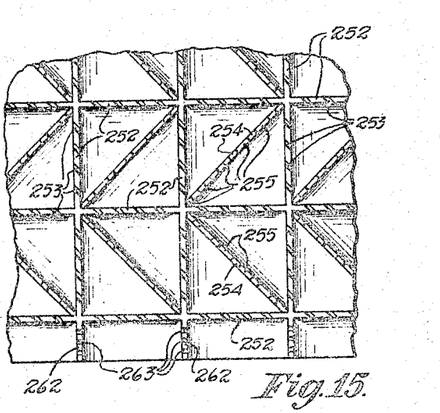
Fig. 15 is a development, on a slightly reduced scale, of a pattern for the forming roll that may be employed to produce the cracker of Fig. 12.
Figure 16:
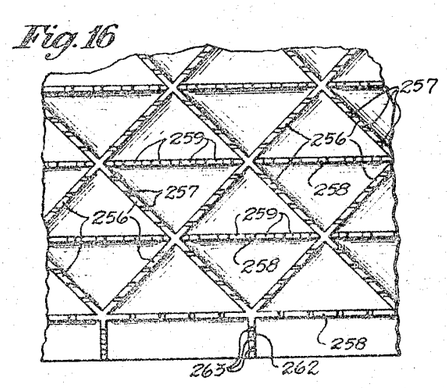
Fig. 16 is a similar view of a second pattern that may be employed to produce the same cracker.

The cracker of Figs. 12 and 13 may be provided by either of the patterns of ridges shown in Figs. 15 and 16. In Fig. 15, the ridges 252 that outline the individual dough units are disposed longitudinally and transversely of the dough sheet and have relatively small diagonally-disposed notches 253; whereas the ridges 254 that subdivide the dough units into puff areas are disposed diagonally of the dough sheet and have relatively deep and wide notches 255.

The design shown in Fig. 16 produces the same cracker, but differs from the design in Fig. 15 in having the cracker-outlining ridges disposed diagonally of the dough sheet and the subdividing ridges disposed longitudinally of the sheet, the first named ridges being shown at 256 with notches 257 and the subdividing ridges being shown at 258 with notches 259.

The formed dough sheet is in effect peeled from the forming roll, and since the recesses of the roll clear the dough, the tendency of the dough to adhere to the forming roll is confined to the ridges of the roll; as a result, the pattern shown in Fig. 15 causes a jerky peeling action, the adherence of the sheet to the roll being momentarily multiplied many times when the peeling action encounters one of transverse ribs 252. For this reason, the pattern shown in Fig. 16 is believed to be the more desirable, since there are no transverse ribs perpendicular to the direction of movement of the dough sheet. An additional reason for preferring the pattern shown in Fig. 16 is that the puff areas are longer in the direction the sheet travels, the result being greater freedom for air to escape from each puff area as it is being formed.

Although the margin of the dough sheet may be left as a plain strip to support the marginal crackers during baking, such marginal strip being discarded, it is preferable to break up the marginal strip by short, transverse ribs 262, having notches 263 as shown in Figs. 15 and 16, to provide relatively small crackers, which may be sold either separately or intermixed with the other crackers. In such case, distortion in baking is confined solely to the marginal strip where it is not important, and the uniformity of the primary crackers is maintained.

Figures 5, 14:
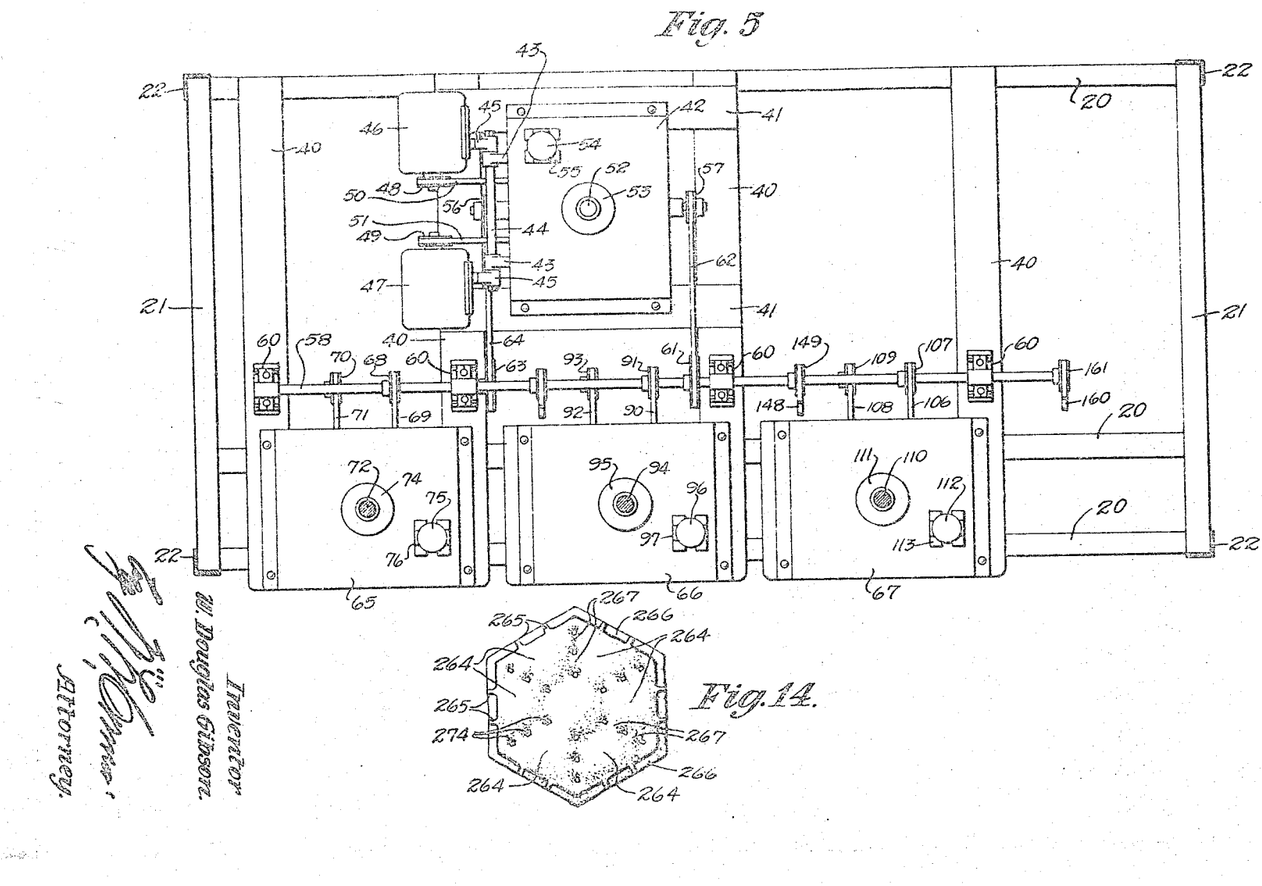
Fig. 5 is a horizontal, longitudinal section taken on the broken line 4—4 of Fig. 1.
Fig. 14 is a plan view of a cracker of a different shape that may be produced by my process.

As a further example, another type of cracker is hexagonal in shape, as shown in Fig. 14, the cracker having six symmetrically arranged puff areas 264. Here again the ribs 265 of the peripheral web 266 are relatively narrow and shallow compared to the ribs 267 of the radial lines that subdivide the crackers. A development of a design for the roll that will produce this cracker is shown in Fig. 17.

Figure 17:
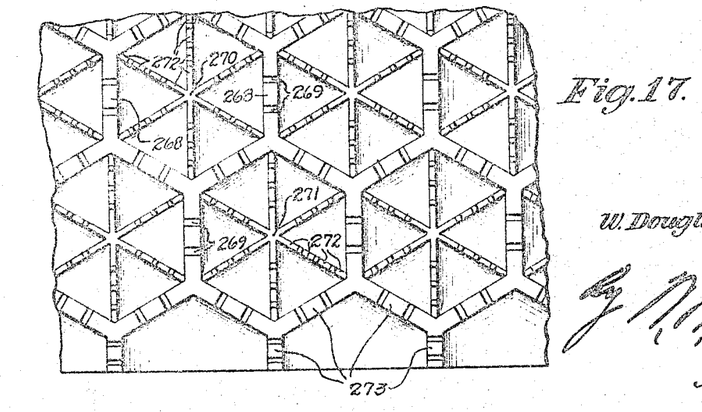
Fig. 17 is a developed view of a pattern that may be employed to produce the cracker shown in Fig. 14.

Inspection of Fig. 17 reveals a pattern of diagonal and lateral ridges, each ridge having portions that outline dough units and portions that subdivide dough units, the portions being distinguishable both by the fact that fewer notches appear in the portions of the ridges that define edges of contiguous crackers and by the fact that such portions of the ridges are of greater width than the portions that subdivide individual dough units into puff areas. For instance, lateral ridge 268 has only two relatively narrow and shallow notches 269 in that portion of the ridge that forms one edge of the cracker centered at 270; whereas an equally extensive portion of the same ridge that serves to subdivide a cracker centered at 271 has four relatively extensive notches 272, one of the notches being in the center of the cracker. It will be observed that the above remarks describing a transverse ridge apply also to the diagonal ridges of the pattern. In this particular design, marginal crackers are formed as indicated by ridges 273, these ridges also being relatively wide and having only slight notches.

It will be noticed in both Figs. 12 and 14, that the subdividing ridges of the forming roll have impressed the dough at various points, leaving depressions 274. Pressure at these points has served to pin the two sides of the dough together. This function is performed by the dockers of the prior art.

The formed dough sheet 38 is carried by conveyor belt 39 to the oven belt 158, and inasmuch as the formed dough sheet may be stretched longitudinally either by a tendency to cling to the surface of roll 37 or because of longitudinal tension in the formed sheet while passing in space to belt 39, it may be desirable to again crowd the dough sheet longitudinally to eradicate distortion of the dough unit engendered by such elongation.

Such longitudinal crowding may be provided in the course of transmission from belt 39 of the dough-treating mechanism to belt 158 of the oven. This particular act of crowding the dough sheet, which may be of great importance in the appearance of the finished crackers, may not be attained conveniently by changing the speed of the oven belt through rheostat 195. The most practical control of the crowding effect is to be had by regulating the speed of belt 39, but the speed of belt 39 is critically related to the speeds of the moving parts performing the prior steps of the process, particularly the speed of the forming roll. An important advantage of having a master speed control for the whole chain of dough-treating mechanism now becomes apparent, because adjustment of the master control will regulate the crowding effect at the point the dough is delivered to the oven, such regulation being accomplished without upsetting the critical speed relationships between the various moving parts of the preceding chain of mechanism.

After receiving a sprinkling of salt from hopper 164, the formed dough sheet 138 passes into the oven where it is first dehydrated and then baked into a rigid, fragile sheet, the interconnected dough units preventing distortion of the crackers in baking. Issuing from the oven, the baked sheet is subjected while still hot to the oil spray treatment. Finally, the end of the sheet protruding beyond the edge of the finishing table is continually broken off by the action of roll 233.

Roll 233 tends to break the crackers into transverse strips 273 (Fig. 4), although individual crackers are separated also as indicated at 274. For the most part, the strips are broken by their fall into tray 38. Practically all interconnections that survive the impact of the fall may be broken by the simple act on the part of an attendant of pressing down on the mass of crackers in the basket, the flexibility of the tray bottom being provided for this purpose. These various provisions for separating a fragile, baked sheet into individual cracker units with a minimum of manual labor comprise one of the features of my invention.

The preferred sequence of operations in my process and the apparatus for performing those steps has been described, but obviously both the procedure and the apparatus may be simplified.

Figure 18:
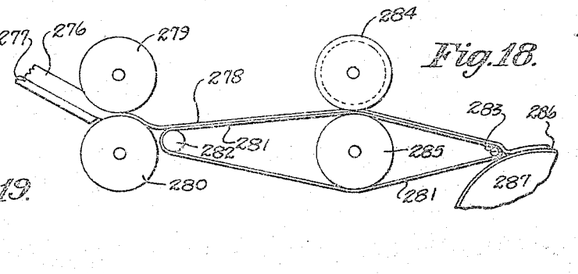
Fig. 18 is a diagrammatic view indicating a modification of my apparatus.
Figure 19:
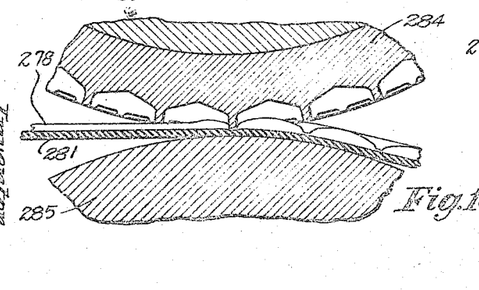
Fig. 19 is a greatly enlarged fragmentary section showing dough passing under the forming roll of the apparatus indicated in Fig. 18.

A modification in the direction of simplicity is indicated by Figs. 18 and 19. Dough slab 276 supported by feed board 277 is reduced to a continuous dough sheet 278 in one stage by a suitable pair of rolls 279 and 280, and is then delivered to a conveyor belt 281. Belt 281 passes around a suitable roll 282 towards the front of the apparatus and a second smaller roll 283 near the receiving end of the oven. From belt 281 the dough is transmitted to oven belt 286 driven by oven pulley 287. Belt 281, as it carries the dough, passes between forming roll 284 and the complementary lower roll 285. Preferably, lower roll 285 is of unyielding material, belt 281 being depended upon for any required resiliency. For this purpose, the belt will be of rubber.

While this arrangement does not provide the same opportunities as previously described for crowding the sheet longitudinally prior to application of the forming roll, it does have certain advantages. The problem of transferring the dough sheet from one conveying surface to another is simplified by the arrangement of belt 281 and the arrangement does avoid the necessity of peeling dough away from roll 285. Elongation of the formed dough sheet is confined to the tendency of the sheet to adhere to forming roll 284, and such slight elongation may be readily overcome by causing the dough to crowd at the point of delivery to the oven belt. It is apparent, also, that in this form of the invention only two speed controls are necessary, one for the pair of rolls 279 and 280 and the other for the pair of rolls 284 and 285. Fig. 19 shows the dough sheet in this arrangement passing under forming roll 284. The action here is substantially that previously described.

For the purposes of adequate disclosure and to teach the principles involved to those interested in this art, I have disclosed one specific sequence of operations as an example of my process, and have described a specific apparatus for carrying out that sequence; and I have suggested the manner in which both the preferred operation and the mechanism for carrying out that operation may be simplified. Other modifications and changes in my procedure for applying the principles involved are suggested by my disclosure, and I reserve the right to all such modifications and changes that properly come within the scope of my appended claims.

Having described my invention, I claim:

1. The method of: progressively reducing a quantity of dough to a given thickness in the form of a continuous sheet of suitable width; progressively scoring said sheet in a continuous operation to divide it into a plurality of interconnected polygonal dough units while at the same time progressively crowding the dough towards the points of scoring sufficient to cause it to bulge between the scores; and baking successive areas of said sheet of interconnected units in a continuous operation.

2. The method of: progressively reducing a quantity of dough to a given thickness in the form of a continuous sheet of suitable width; progressively scoring said sheet in a continuous operation to divide it into a plurality of interconnected polygonal dough units, the scoring of the marginal edges of the dough units being of uniform width and depth and formed successively, and at the same time progressively crowding the dough towards the points of scoring sufficient to cause it to bulge between the scores; and baking successive areas of said sheet of interconnected units in a continuous operation.

3. The method of: progressively reducing a quantity of dough to a given thickness in the form of a continuous sheet of suitable width; progressively scoring said sheet in a continuous operation to divide it into a plurality of interconnected polygonal dough units while at the same time progressively crowding the dough towards the points of scoring sufficient to cause it to bulge between the scores; baking successive areas of said sheet of interconnected units in a continuous operation; and applying a fine spray of oil to said sheet while it is still in the form of a plurality of interconnected units and while still in a highly heated condition.

4. The method of: progressively reducing a quantity of dough to a given thickness in the form of a continuous sheet of suitable width; progressively scoring said sheet, in a continuous operation, to divide it into a plurality of interconnected polygonal dough units; scoring the marginal edges of the dough units to a uniform depth and width and scoring said units to a lesser depth to form puff areas while at the same time progressively crowding the dough towards the points of scoring sufficient to cause it to bulge between the scores; and baking successive areas of said sheet of interconnected units in a continuous operation.

5. The method of: progressively reducing a quantity of dough to a given thickness in the form of a continuous sheet of suitable width; progressively scoring said sheet, in a continuous operation, to divide it into a plurality of interconnected polygonal dough units; scoring the marginal edges of the dough units to a uniform depth and width and scoring said units to a lesser depth to form puff areas while at the same time progressively crowding the dough towards the points of scoring sufficient to cause it to bulge between the scores; baking successive areas of said sheet of interconnected units in a continuous operation; and applying a fine spray of oil to said sheet while it is still in the form of a plurality of interconnected units and while still in a highly heated condition.

6. The method of: progressively reducing a quantity of dough to a given thickness in the form of a continuous sheet of suitable width; progressively scoring said sheet, in a continuous operation, to divide it into a plurality of interconnected polygonal dough units, by feeding it onto a scoring roll to form the scores successively while at the same time progressively crowding the dough towards the points of scoring sufficient to cause it to bulge between the scores; and baking successive areas of said sheet of interconnected units in a continuous operation.

7. The method of: progressively reducing a quantity of dough to a given thickness in the form of a continuous sheet of suitable width; progressively scoring said sheet, in a continuous operation, to divide it into a plurality of interconnected polygonal dough units, by feeding it onto a scoring roll to form the scores successsively while at the same time progressively crowding the dough towards the points of scoring sufficient to cause it to bulge between the scores; baking successive areas of said sheet of interconnected units in a continuous operation; and applying a fine spray of oil to said sheet while it is still in the form of a plurality of interconnected units and while still in a highly heated condition.

W. DOUGLAS GIBSON.